UNITED STATES PATENT OFFICE

GEORGE CORBIN BAILEY, OF ELIZABETH, NEW JERSEY, ASSIGNOR, BY MESNE ASSIGNMENTS, TO THE ROESSLER & HASSLACHER CHEMICAL COMPANY, A CORPORATION OF DELAWARE

MANUFACTURE OF ORGANIC DISULPHIDES

No Drawing. Application filed May 19, 1928. Serial No. 279,221.

This invention relates to the manufacture of disulphide compounds of the general formula R—S—S—R by a coupling of two radicals of a compound having the general formula R—S—M wherein R is an organic radical. More specifically the invention refers to disulphides from compounds of the type

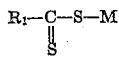

which may be regarded as metal salts of substituted dithio acids wherein M represents a metal such as e. g. zinc, sodium, potassium, or its equivalent such as ammonia and $R_1$ comprises an organic radical.

In my copending application S. N. 175,633, filed March 15, 1927, I have disclosed and claimed the manufacture of dixanthogens from the corresponding xanthates. In this case $R_1$ is an alkoxy radical, and, as specifically described therein, an isopropoxy radical.

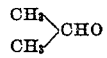

This application is specifically directed to the manufacture of thiuram disulphides wherein R of the general formula is the corresponding radical from a dithiocarbamate and $R_1$ of the sub type formula,

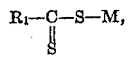

is an organic amino radical. Thus the specific disulphides of this application will have the general formula

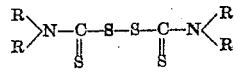

wherein the symbols R may represent the same or dissimilar organic radicals.

The object of the invention is the manufacture of such disulphide compounds by utilizing a water solution of an alkali metal hypochlorite to cause the coupling to take place. Special illustration of the invention is given as applied to the manufacture of thiuram disulphides of which the tetramethyl thiuram disulphide described is a member. These bodies are useful as accelerators for the vulcanization of rubber.

I am aware that it has previously been proposed to manufacture these compounds by various oxidation and coupling methods, but I have found that those proposed have objectionable features. Thus, as disclosed in my copending application, chlorine itself has been tried, but I have found that with xanthates for example, an oil is formed comprising a complex mixture from which it is very difficult to isolate a pure dixanthogen. The utilization of sodium hypochlorite on the contrary in aqueous solution acting on aqueous solutions of alkali metal xanthates gives high yields and high purity products.

I have found that sodium hypochlorite can also, be used in the oxidation of dithiocarbamates. An aqueous solution containing approximately 170 grams sodium dimethyl dithiocarbamate was treated at about 4–7° C., with 1424 grams of sodium hypochlorite solution. The addition of the hypochlorite solution was stopped when a blue color resulted on starch iodide paper. The product was collected on a suction filter and washed free of caustic and chlorides with water. The dried precipitate weighed 67 grams; melting point 144° C.; color slightly pinkish.

The sodium hypochlorite solution used in this experiment was prepared by passing 130 grams of chlorine into a solution of 167 grams NaOH in a mixture of 800 grams water and 800 grams of ice.

Claims:
1. Process for the production of a compound of the general formula R—S—S—R which comprises coupling two radicals of a compound of the type R—S—M by means of sodium hypochlorite in an aqueous solution, R representing an organic radical and M a metal radical.

2. Process for the production of a compound having the general formula

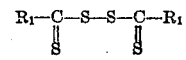

which comprises treating a compound of the type

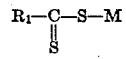

with sodium hypochlorite, $R_1$ comprising an organic radical and M a metal radical.

3. Process for the manufacture of a disulphide which comprises treating a salt of a substituted dithio acid with sodium hypochlorite.

4. Process for the manufacture of a disulphide which comprises treating a water soluble salt of a substituted dithio acid with sodium hypochlorite in aqueous solution.

5. Process for the production of a compound having the general formula $$R_1-\underset{\underset{S}{\|}}{C}-S-S-\underset{\underset{S}{\|}}{C}-R_1$$

which comprises treating a water soluble compound of the type $$R_1-\underset{\underset{S}{\|}}{C}-S-M$$

with sodium hypochlorite in an aqueous solution, $R_1$ comprising an organic radical and M a metal radical.

6. Process for the production of a compound having the general formula $$R_1-\underset{\underset{S}{\|}}{C}-S-S-\underset{\underset{S}{\|}}{C}-R_1$$

which comprises treating a water soluble compound of the type $$R_1-\underset{\underset{S}{\|}}{C}-S-M$$

with sodium hypochlorite in an aqueous solution, $R_1$ representing an organic radical containing, and attached by, one of the elements C, N or O to the C of the general formula and M representing an alkali metal.

7. Process for the manufacture of a disulphide which comprises treating a water soluble alkali metal salt of a substituted dithio acid with sodium hypochlorite in an aqueous solution.

8. Process for the production of a compound having the general formula $$\underset{R'}{\overset{R}{>}}N-\underset{\underset{S}{\|}}{C}-S-S-\underset{\underset{S}{\|}}{C}-N\underset{R}{\overset{R}{<}}$$

which comprises treating a water soluble compound of the type $$\underset{R'}{\overset{R}{>}}N-\underset{\underset{S}{\|}}{C}-S-M$$

with sodium hypochlorite in an aqueous solution, R representing an organic radical and M an alkali metal.

9. Process for the production of a thiuram disulphide which comprises treating a salt of the corresponding dithio carbamate with sodium hypochlorite.

10. Process for the production of a thiuram disulphide which comprises treating a water soluble salt of the corresponding dithio carbamate with sodium hypochlorite in an aqueous solution.

11. Process for the production of a thiuram disulphide which comprises treating a water soluble alkali metal salt of the corresponding dithio carbamate with sodium hypochlorite in an aqueous solution.

12. Process for the production of a thiuram disulphide which comprises treating a water soluble sodium salt of the corresponding dithio carbamate with sodium hypochlorite in an aqueous solution.

13. Process for the production of tetramethyl thiuram disulphide which comprises treating sodium dimethyl dithio carbamate with sodium hypochlorite in an aqueous solution.

Signed at Perth Amboy, in the county of Middlesex and State of New Jersey, this 16th day of May, A. D. 1928.

GEORGE CORBIN BAILEY.